United States Patent
Suzuki et al.

(10) Patent No.: US 7,875,999 B2
(45) Date of Patent: Jan. 25, 2011

(54) ELECTRONIC APPARATUS AND FUEL CELL SYSTEM

(75) Inventors: Hidenori Suzuki, Yokohama (JP);
Kiyoshi Senoue, Yokohama (JP);
Makoto Miyahara, Kawasaki (JP);
Kenichi Takahashi, Yokohama (JP);
Michiyuki Kitamoto, Yokohama (JP);
Yukinori Akamoto, Imba-gun (JP);
Yoshie Ozeki, Saitama (JP); Takashi Shimoyamada, Kawasaki (JP); Hideaki Yasui, Yokohama (JP); Hiroyuki Hasebe, Chigasaki (JP); Koichi Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/236,273

(22) Filed: Sep. 23, 2008

(65) Prior Publication Data
US 2009/0085410 A1   Apr. 2, 2009

Related U.S. Application Data

(63) Continuation of application No. PCT/JP2007/056239, filed on Mar. 26, 2007.

(30) Foreign Application Priority Data
Mar. 28, 2006  (JP) .............................. 2006-087855

(51) Int. Cl.
*H01H 9/54* (2006.01)
(52) U.S. Cl. .................................................. 307/140
(58) Field of Classification Search .................. 307/140
See application file for complete search history.

(56) References Cited

U.S. PATENT DOCUMENTS

| 5,396,443 | A | 3/1995 | Mese et al. |
| 2004/0207267 | A1 | 10/2004 | Ozeki et al. |
| 2005/0079396 | A1* | 4/2005 | Ozeki et al. .................. 429/23 |
| 2005/0201050 | A1 | 9/2005 | Hayashi et al. |
| 2005/0280392 | A1 | 12/2005 | Nguyen |

FOREIGN PATENT DOCUMENTS

| JP | 04-308910 | 10/1992 |
| JP | 06-119090 | 4/1994 |

(Continued)

OTHER PUBLICATIONS

International Preliminary Report on Patentability and Written Opinion issued by the International Bureau of WIPO on Oct. 30, 2008, for International Application No. PCT/JP2007/056239.

(Continued)

*Primary Examiner*—Robert L. Deberadinis
(74) *Attorney, Agent, or Firm*—Finnegan, Henderson, Farabow, Garrett & Dunner, L.L.P.

(57) ABSTRACT

A PDA, which functions as an electronic unit, includes power supply which includes a fuel cell unit and an auxiliary power supply which is charged by an output of the fuel cell unit. A non-use state of the PDA is detected by non-use detection unit. Upon detection of the non-use state by the non-use detection unit, the output from the fuel cell unit is stopped and an output of the auxiliary power supply is shut off.

11 Claims, 8 Drawing Sheets

FOREIGN PATENT DOCUMENTS

| | | | |
|---|---|---|---|
| JP | 06 119090 | * | 4/1994 |
| JP | 2000-106201 | | 4/2000 |
| JP | 2004-126818 | | 4/2004 |
| JP | 2004-127618 | | 4/2004 |
| JP | 2004-265000 | | 9/2004 |
| JP | 2005-025409 | | 1/2005 |
| TW | 564342 | | 12/2003 |
| TW | M278147 | | 10/2005 |
| WO | WO 2005/043664 A1 | | 5/2005 |

OTHER PUBLICATIONS

Notification of Reasons for Rejection mailed Jul. 13, 2010, from the Japanese Patent Office for Japanese Patent Application No. 2008-509747 (4 pages).

Notification of Examination Opinion, mailed Oct. 10, 2010, in corresponding Taiwan Patent Application No. 096110886, and English-language translation thereof.

* cited by examiner

ELECTRONIC APPARATUS AND FUEL CELL SYSTEM

CROSS-REFERENCE TO RELATED APPLICATIONS

This is a Continuation Application of PCT Application No. PCT/JP2007/056239, filed Mar. 26, 2007, which was published under PCT Article 21(2) in Japanese.

This application is based upon and claims the benefit of priority from prior Japanese Patent Application No. 2006-087855, filed Mar. 28, 2006, the entire contents of which are incorporated herein by reference.

BACKGROUND OF THE INVENTION

1. Field of the Invention

The present invention relates to an electronic apparatus in which a fuel cell is used as a power supply, and to a fuel cell system.

2. Description of the Related Art

Electronic apparatuses, such as a portable audio device and a personal digital assistant (PDA), have recently been remarkably reduced in size. With the reduction in size of these electronic apparatuses, there has been an attempt to use a fuel cell as a power supply. The fuel cell has the advantage that electricity can be generated simply by supplying a fuel and an oxidizer and electricity can continuously be generated only by replacing the fuel. Thus, if the size of the fuel cell can be reduced, the fuel cell is very effective as a power supply of a small-sized electronic apparatus.

Attention has recently been paid to a direct methanol fuel cell (DMFC) as a fuel cell. The DMFC is configured such that an electrolyte membrane is disposed between an anode and a cathode. Each of the anode and cathode comprises a collector and a catalyst layer. At the anode, methanol aqueous solution is supplied as fuel, and protons are generated by catalysis. On the other hand, at the cathode (air electrode), air is supplied from an air intake port. At the cathode, protons, which have passed through the electrolyte membrane, react with oxygen, which is contained in the air that is supplied from the outside, on the catalyst, and thereby electrical power is generated. In this manner, in the DMFC, methanol having high energy density is used as fuel, and an electric current is directly obtained from the methanol on the electrode catalyst. Since the methanol requires no reforming, the DMFC can be reduced in size and the handling of fuel is easier, compared to hydrogen gas. Thus, the DMFC is prospective as a power supply of a portable electronic apparatus.

On the other hand, in the electronic apparatus using the fuel cell as a power supply, a secondary cell is used as an auxiliary power supply for supplying auxiliary power in compensation for deficiency of power that is output from the fuel cell. The secondary cell is always charged by the power that is output from the fuel cell.

Jpn. Pat. Appln. KOKAI Publication No. 2000-106201, for instance, discloses such a fuel cell. In addition, PCT International Publication No. WO2005/043664 discloses a fuel cell system which enables power supply to an electronic apparatus.

As regards these conventional electronic apparatuses, it is known that the time in which the electronic apparatus is not used is, in most cases, longer than the time in which the electronic apparatus is actually used. However, even in the state in which the electronic apparatus is not used, that is, even in the state in which the load side does not operate at all, fuel is constantly supplied to the fuel cell, and output power is generated from the fuel cell. Thus, the secondary cell is being charged by the fuel cell in the state in which the electronic apparatus is not used. In other words, the secondary cell is continuously charged by the fuel cell in a very low load state in which the electronic apparatus is not used. Consequently, there arises such a problem that the secondary cell is kept for a long time in a fully charged state or in an approximately fully charged state.

BRIEF SUMMARY OF THE INVENTION

The object of the present invention is to provide an electronic apparatus using a fuel cell as a power supply, which can stop output from the power supply by detecting a non-use state of the electronic apparatus, and a fuel cell system.

According to the present invention, there is provided an electronic apparatus comprising: an electronic unit; power supply means for supplying electric power to the electronic unit, the power supply means including power generation means having a fuel cell unit, and an auxiliary power supply which is charged by an output of the power generation means; non-use detection means for detecting a non-use state of the electronic unit; and control means for stopping the output of the power generation means and shutting off an output of the auxiliary power supply, upon detection of the non-use state by the non-use detection means.

The above-described electronic apparatus further comprises operation means for operating the electronic unit, wherein the non-use detection means detects the non-use state of the electronic unit in a case where the operation means is not operated continuously for a predetermined time period.

The above-described electronic apparatus further comprises electrostatic capacitance detection means for detecting a variation in electrostatic capacitance in the electronic unit, wherein the non-use detection means detects the non-use state of the electronic unit in a case where the electrostatic capacitance, which is detected by the electrostatic capacitance detection means, is in a state of a predetermined value continuously for a predetermined time period.

The above-described electronic apparatus further comprises image pickup means for capturing an image of characteristic parts of an operator, and memory means for storing image data of the characteristic parts of the operator in advance, wherein the non-use detection means detects the non-use state of the electronic unit in a case where a state of disagreement between a captured image, which is acquired by the image pickup means, and image data in the memory means continues for a predetermined time period.

The above-described electronic apparatus further comprises fingerprint detection means for detecting fingerprint data of an operator, wherein the non-use detection means detects the non-use state of the electronic unit in a case where a state of disagreement between the fingerprint data, which is detected by the fingerprint detection means, and fingerprint data of the operator, which is prepared in advance, continues for a predetermined time period.

The above-described electronic apparatus further comprises electricity amount detection means for detecting an electricity consumption amount of the electronic unit, wherein the non-use detection means detects the non-use state of the electronic unit in a case where the electricity consumption amount, which is detected by the electricity amount detection means, is in a state of a predetermined value continuously for a predetermined time period.

The above-described electronic apparatus further comprises brightness detection means for detecting ambient brightness, wherein the non-use detection means detects the non-use state of the electronic unit in a case where brightness data, which is detected by the brightness detection means, is in a state of a predetermined value continuously for a predetermined time period.

In the above-described electronic apparatus, the power generation means includes a fuel cell unit and output adjusting means for adjusting an output of the fuel cell unit, wherein the control means stops an operation of the output adjusting means and shuts off an output of the auxiliary power supply, upon detection of the non-use state by the non-use detection means.

In any one of the above-described electronic apparatuses, the control means stops supply of at least one of fuel and air to the fuel cell unit, and shuts off an output of the auxiliary power supply, upon detection of the non-use state by the non-use detection means.

According to the present invention, there is provided a fuel cell system which supplies electric power to an electronic unit and includes power generation means having a fuel cell unit and output adjusting means for adjusting an output of the fuel cell unit, and an auxiliary power supply which is charged by an output of the power generation means, wherein the fuel cell system includes control means for stopping the output of the power generation means and shutting off an output of the auxiliary power supply, on the basis of a non-use state of the electronic unit.

In the above-described fuel cell system, the control means stops an operation of the output adjusting means and shuts off the output of the auxiliary power supply, on the basis of the non-use state of the electronic unit.

In the above-described fuel cell system, the control means stops supply of at least one of fuel and air to the fuel cell unit, and shuts off the output of the auxiliary power supply, on the basis of the non-use state of the electronic unit.

DETAILED DESCRIPTION OF THE INVENTION

Electronic apparatuses and fuel cell systems according to embodiments of the present invention will now be described in detail with reference to the accompanying drawings.

First Embodiment

Figure 1:
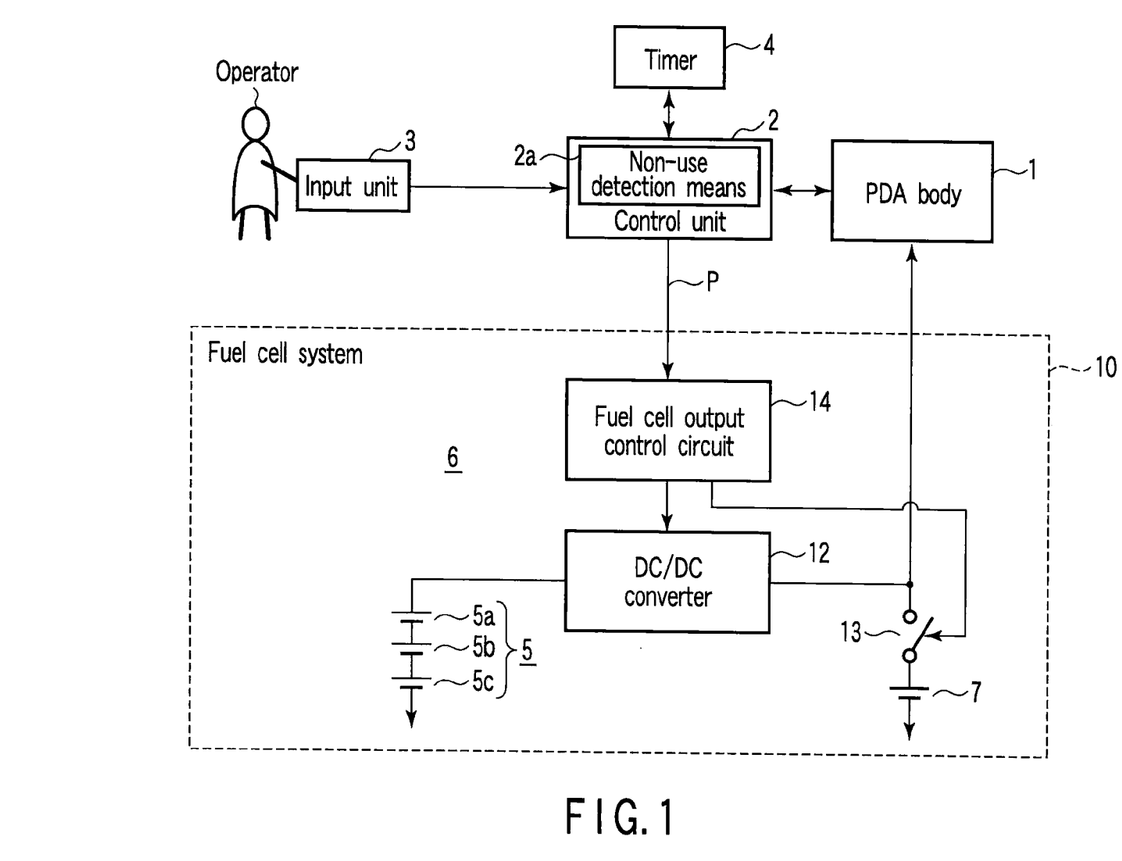
FIG. 1 is a block diagram which schematically shows an electronic apparatus according to a first embodiment of the present invention.

FIG. 1 schematically shows the structure of an electronic apparatus according to a first embodiment of the present invention. FIG. 1 shows a personal digital assistant (PDA) as an example of the electronic apparatus.

In FIG. 1, numeral 1 denotes a PDA body, and a control unit 2 is connected to the PDA 1. An input unit 3 is connected to the control unit 2, and also a timer 4 is connected to the control unit 2.

The control unit 2 controls the PDA 1 in accordance with data which is input from the input unit 3. The control unit 2 controls the functions of the PDA 1, for example, personal information management functions such as schedule management and appointment management. In addition, the control unit 2 controls an electronic dictionary and respective units in the PDA 1 in order to realize a connection function to the Internet. The control unit 2 includes non-use detection means 2a for detecting a non-use state of the PDA 1. The control unit 2 monitors an operation state of the input unit 3 by an operator. In a case where the input unit 3 is not operated continuously for a predetermined time period which is preset in the timer 4, the control unit 2 determines that the PDA is in a non-use state, and outputs a PDA non-use signal P.

Figure 2:
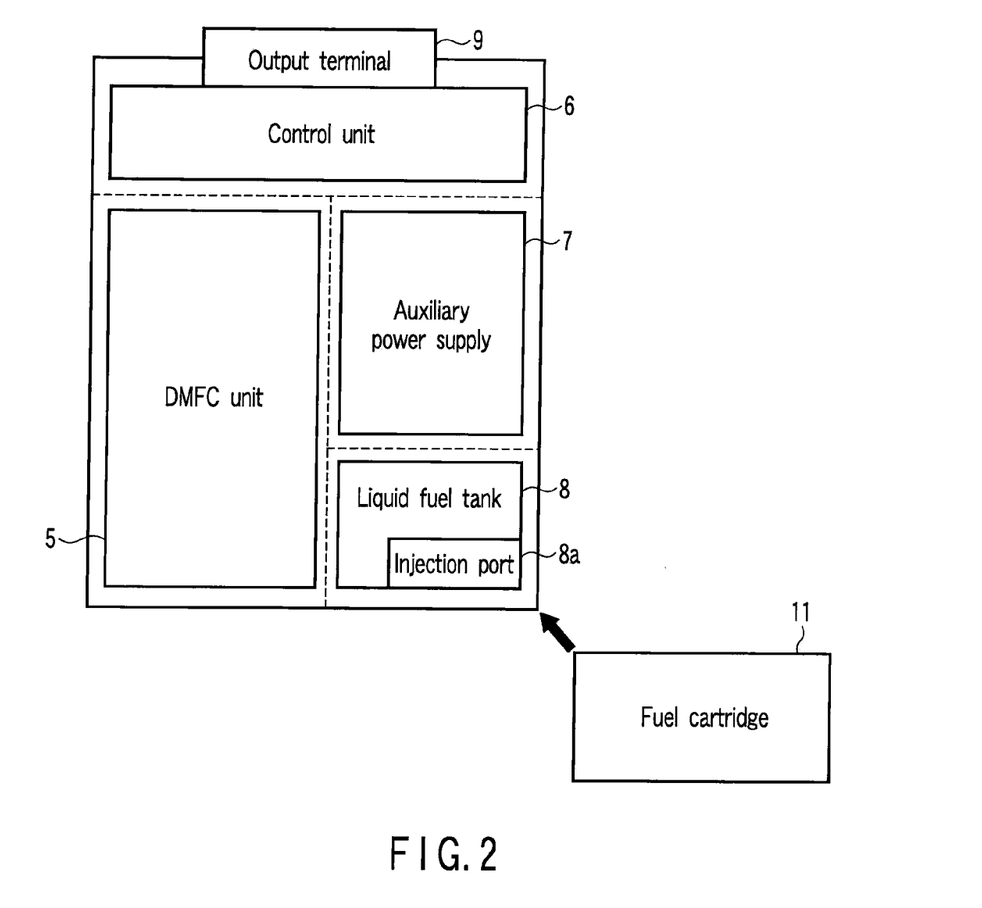
FIG. 2 is an arrangement view which schematically shows the structure of a fuel cell system shown in FIG. 1.

In a power supply chamber (not shown) of the above-described PDA, a fuel cell system 10 is provided as power supply means. FIG. 2 schematically shows the structure of the fuel cell system 10, which is provided with a DMFC unit 5 as a fuel cell unit, a control unit 6, an auxiliary power supply 7, a liquid fuel tank 8 and an output terminal 9.

The DMFC unit 5 is composed of a plurality of power generation cells 5a, 5b and 5c which are to be described later. Each of the power generation cells 5a, 5b and 5c includes a membrane electrode assembly (MEA). The membrane electrode assembly (MEA) comprises a cathode which is composed of a cathode catalyst layer and a cathode gas diffusion layer, an anode which is composed of an anode catalyst layer and an anode gas diffusion layer, and a proton-conducting electrolyte membrane which is disposed between the cathode catalyst layer and the anode catalyst layer. At the anode, methanol aqueous solution is supplied as fuel, and protons are generated by catalysis. On the other hand, at the cathode (air electrode), air is supplied from an air intake port. At the cathode, protons, which have passed through the electrolyte membrane, react with oxygen, which is contained in the supplied air, on the catalyst, and thereby electrical power is generated. The DMFC unit 5, which is used here, is of a passive type wherein fuel and air are supplied by making use of convection, concentration gradient, etc.

The liquid fuel tank 8 is filled with pure methanol or methanol aqueous solution as fuel. This fuel is supplied to the DMFC unit 5 via a supply path (not shown). The liquid fuel tank 8 is provided with an injection port 8a. A fuel cartridge 11 is detachably attached to the injection port 8a, and fuel is injected from the fuel cartridge 11 into the liquid fuel tank 8.

The liquid fuel that is contained in the liquid fuel tank 8 is not necessarily limited to the methanol fuel. Other usable liquid fuels include ethanol fuel such as ethanol aqueous solution or pure ethanol; propanol fuel such as propanol aqueous solution or pure propanol; glycol fuel such as glycol aqueous solution or pure glycol; dimethyl ether; formic acid, etc. In any case, liquid fuels matching with fuel cells are used.

The control unit 6 is composed of a control circuit as shown in FIG. 1. The DMFC unit 5 includes the plural power generation cells 5a, 5b and 5c, and a predetermined output voltage is generated by connecting the power generation cells 5a, 5b and 5c in series. A boost-type DC/DC converter 12 is connected as output adjusting means to the DMFC unit 5. The DC/DC converter 12, together with the DMFC unit 5, constitutes power generation means, and includes a switching element (not shown) and an energy accumulation element (not shown). By the switching element and the energy accumulation element, the electric energy that is generated by the DMFC unit 5 is accumulated/discharged. Thus, a relatively low output voltage of the DMFC unit 5 is boosted up to an adequate voltage and supplied to the PDA 1 via the output terminal 9.

Although the standard boost-type DC/DC converter 12 is exemplified here, other circuit schemes are implementable if a boost operation can be performed.

A fuel cell output control circuit 14 is connected as control means to the DC/DC converter 12. The fuel cell output control circuit 14 is connected to the control unit 2, and controls the switching element (not shown) of the DC/DC converter 12 in accordance with a control instruction from the control unit 2 and controls the output voltage of the DMFC unit 5. In addition, upon receiving the PDA non-use signal P from the control unit 2, the fuel cell output control circuit 14 forcibly turns off the operation of the switching element of the DC/DC converter 12, thereby to stop the power generation of the DMFC unit 5.

An auxiliary power supply 7 is connected to the DC/DC converter 12 via a switch 13 which functions as power path shut-off means. The auxiliary power supply 7 can be charged by the output from the DC/DC converter 12. In addition, the auxiliary power supply 7 supplies an electric current in association with an instantaneous load variation of the PDA 1, and is used as a driving power supply of the PDA 1 in a case where the power generation by the DMFC unit 5 is disabled due to a fuel empty state. A rechargeable secondary cell (e.g. a lithium ion battery (LIB)) or an electric double layer capacitor is used as the auxiliary power supply 7.

If the PDA non-use signal P is delivered from the control unit 2 to the fuel cell output control circuit 14, the switch 13 is forcibly turned off and the output from the auxiliary power supply 7 is shut off.

Next, the operation of the above-described electronic apparatus is explained.

In a case where the DMFC unit 5 is used as a power supply, the fuel cell system 10 shown in FIG. 2 is mounted in the power supply chamber (not shown). In this state, the DC/DC converter 12 is controlled by the output from the fuel cell output control circuit 14, thereby boosting the output voltage of the DMFC unit 5 and supplying power to the PDA 1 via the output terminal 9.

The control unit 2 monitors, by the detection means 2a for detecting the non-use state of the PDA, the operation state of the input unit 3 by the operator. Specifically, the control unit 2 determines whether the operation of the input unit 3 by the operator is not performed continuously for a predetermined time period that is preset in the timer 4. If it is determined that the operation of the input unit 3 is not performed continuously for the predetermined time period, the control unit 2 outputs the PDA non-use signal P. The PDA non-use signal P is delivered to the fuel cell output control circuit 14. Upon receiving the PDA non-use signal P, the fuel cell output control circuit 14 forcibly turns off the operation of the switching element of the DC/DC converter 12, thereby stopping the output from the DC/DC converter 12 (DMFC unit 5). In addition, the fuel cell output control circuit 14 forcibly turns off the switch 13 and shuts off the output from the auxiliary power supply 7.

Thus, the operation state of the input unit 3 by the operator is monitored, and in the case where the input unit 3 is not operated continuously for the predetermined time period that is preset in the timer 4, the PDA is determined to be in the non-use state and the PDA non-use signal P is output, and thereby the fuel cell output control circuit 14 forcibly turns off the operation of the DC/DC converter 12 and stops the output from the DC/DC converter 12 (DMFC unit 5). Hence, the auxiliary power supply 7 is prevented from being charged by the DMFC unit 5 in a very low load state in which the PDA is not used. It is thus possible to surely prevent degradation of the auxiliary power supply 7 due to continuous charging of the auxiliary power supply 7 in an approximately fully charged state. Moreover, since the switch 13 is forcibly turned off at the same time as the stop of output from the DMFC unit 5 and the output from the auxiliary power supply 7 is shut off, it is possible to surely prevent the auxiliary power supply 7 from falling in an over-discharged state and being damaged due to the continuous use of the PDA 1 in the state in which the output from the DMFC unit 5 is stopped.

Second Embodiment

Next, an electronic apparatus according to a second embodiment of the invention is described.

Figure 3:
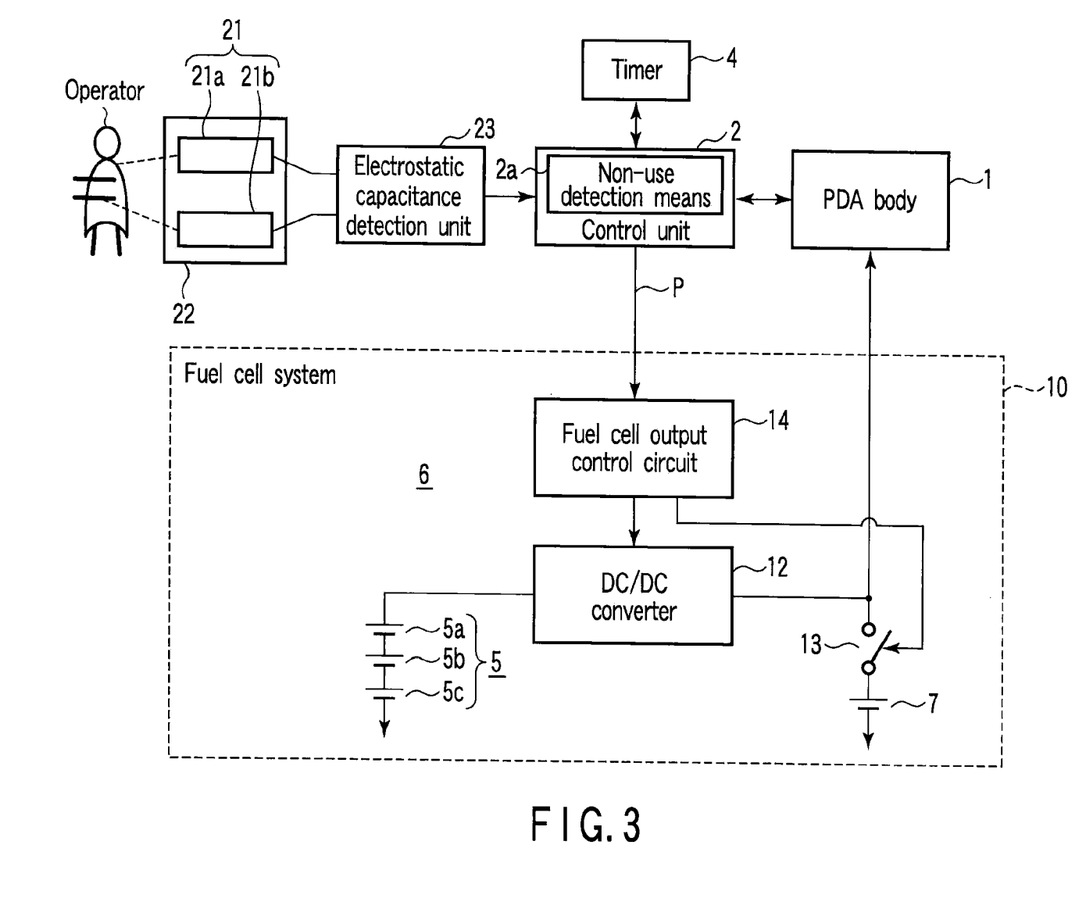
FIG. 3 is a block diagram which schematically shows an electronic apparatus according to a second embodiment of the invention.

FIG. 3 schematically shows the electronic apparatus according to the second embodiment of the invention. In the description of FIG. 3, the same parts as those in FIG. 1 are denoted by like reference numerals, and a description is omitted.

In FIG. 3, numeral 21 denotes an electrostatic capacitance sensor, and the electrostatic capacitance sensor 21 includes a pair of electrodes 21a and 21b. The electrodes 21a and 21b are embedded in a sensor mounting unit 22. The sensor mounting unit 22 is disposed on a place where the sensor mounting unit 22 can easily be touched by the operator when the PDA is used, for example, on a part of the PDA case that is held by the operator during operation. In the electrostatic capacitance sensor 21, the electrostatic capacitance between the pair of electrodes 21a and 21b varies in accordance with whether the operator is in touch with the sensor mounting unit 22. An electrostatic capacitance detection unit 23 is connected to the electrostatic capacitance sensor 21. The electrostatic capacitance sensor 23 detects the variation in electrostatic capacitance of the electrostatic capacitance sensor 21.

The control unit 2 is connected to the electrostatic capacitance sensor 23. In the control unit 2, the non-use detection means 2a monitors a variation in value of the electrostatic capacitance that is detected by the electrostatic capacitance sensor 23. If the value of the electrostatic capacitance that is detected by the electrostatic capacitance sensor 23, that is, the value of the electrostatic capacitance which corresponds to the state in which the operator is not in touch with the sensor mounting unit 22, is output continuously for a predetermined time period that is preset in the timer 4, the non-use detection means 2a determines that the PDA is in the non-use state and outputs the PDA non-use signal P.

As has been described above, the sensor mounting unit 22 is disposed, for example, on a part of the PDA case, which is easily touched by the operator when the PDA is used. In addition, the value of the electrostatic capacitance of the electrostatic capacitance sensor 21, which is provided on the sensor mounting unit 22, is monitored. Thus, if the state in which the operator is not in touch with the sensor mounting unit 22 continues for the preset predetermined time period, the non-use state of the PDA can be determined on the basis of the value of the electrostatic capacitance of the electrostatic capacitance sensor 21 at this time. In response to the determination that the PDA is in the non-use state, the PDA non-use signal P is output to forcibly turn off the operation of the DC/DC converter 12, to stop the output from the DC/DC converter 12 (DMFC unit 5) and to shut off the output of the auxiliary power supply 7. Thereby, the same advantageous effects as in the above-described first embodiment can be obtained.

Third Embodiment

Next, an electronic apparatus according to a third embodiment of the invention is described.

Figure 4:
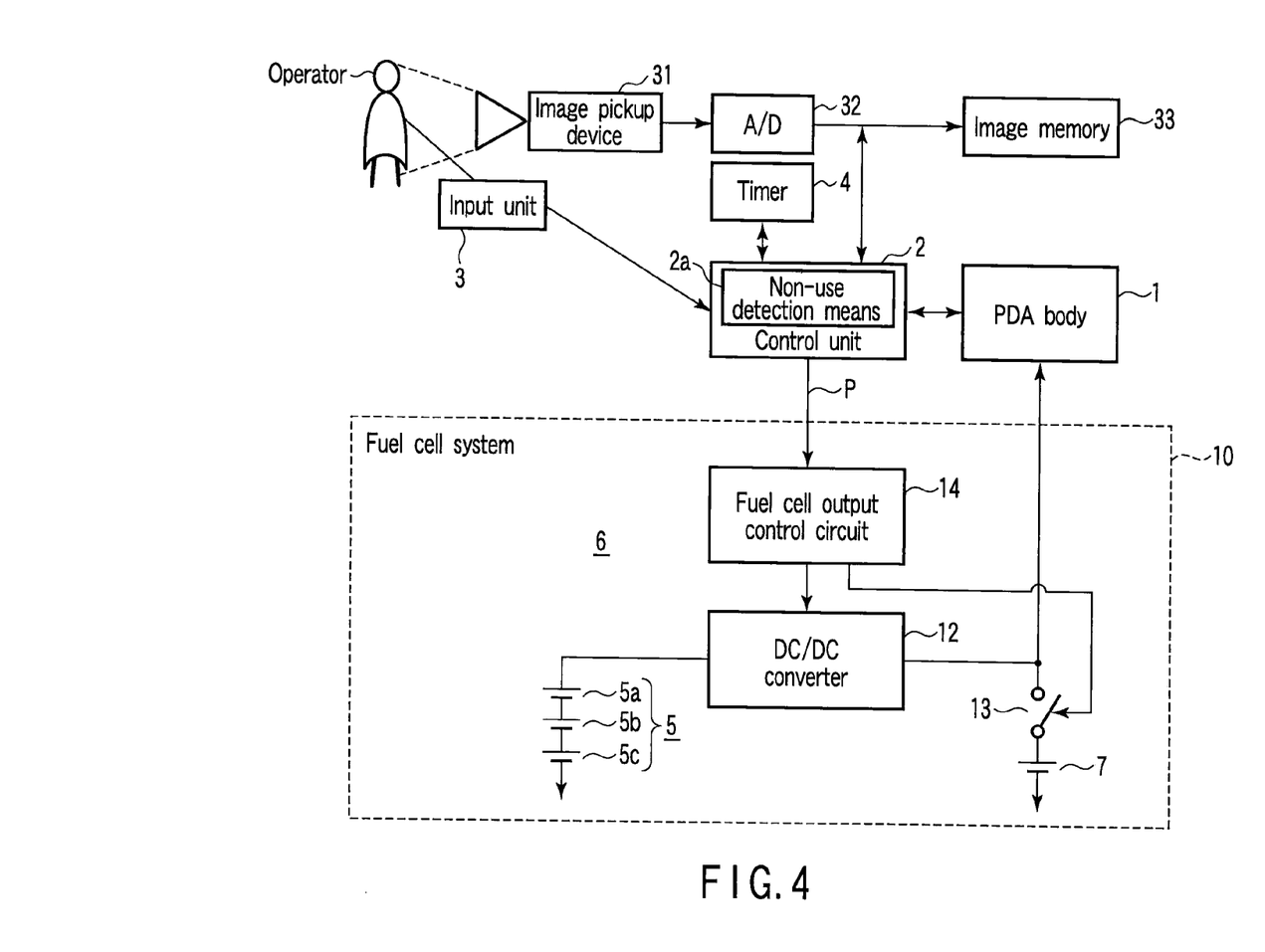
FIG. 4 is a block diagram which schematically shows an electronic apparatus according to a third embodiment of the invention.

FIG. 4 schematically shows the electronic apparatus according to the third embodiment of the invention. In the description of FIG. 4, the same parts as those in FIG. 1 are denoted by like reference numerals, and a description is omitted.

In FIG. 4, numeral 31 denotes an image pickup device functioning as image pickup means. The image pickup device 31 is provided, for example, on the PDA 1 in order to capture images of characteristic parts of the operator, such as the face and body of the operator, when the operator uses the PDA. The control unit 2 is connected to the image pickup device 31 via an A/D converter 32, and a digitally converted image signal is input to the control unit 2. An image memory 33 is connected as memory means to the control unit 2. The image memory 33 stores image data of the characteristic parts of the PDA owner (operator), such as the face and body.

In the control unit 2, the non-use detection means 2a compares a captured image of the characteristic parts of the operator, which is acquired by the image pickup device 31, with the image data of the characteristic parts of the PDA owner, which is prestored in the image memory 33. If the comparison result shows that the state in which both images disagree continues for a predetermined time period that is preset in the timer 4, the control unit 2 determines that the PDA is in the non-use state, and outputs the PDA non-use signal P.

As has been described above, the captured image of the characteristic parts of the operator, such as the face and body, which is acquired by the image pickup device 31, is compared with the image data of the characteristic parts of the PDA owner, which is prestored in the image memory 33. For example, when the operator moves away from the PDA, the captured image from the image pickup device 31 is interrupted and the comparison result shows disagreement with the image data in the image memory 33. If this state continues for the predetermined time period that is preset in the timer 4, the control unit 2 determines that the PDA is in the non-use state. On the basis of this determination, the PDA non-use signal P is output, thereby forcibly turning off the operation of the DC/DC converter 12. Thus, the output from the DC/DC converter 12 (DMFC unit 5) is stopped, and the output from the auxiliary power supply 7 can be shut off.

Furthermore, in the present embodiment, the captured image of the characteristic parts of the operator, which is acquired by the image pickup device 31, is always compared with the image data of the characteristic parts of the PDA owner, which is prestored in the image memory 33. Therefore, even when the PDA is used by a person other than the owner, the power generation of the DMFC unit 5 can forcibly be stopped, and unlawful use of the PDA by a third person can be prevented.

Fourth Embodiment

Next, an electronic apparatus according to a fourth embodiment of the invention is described.

Figure 5:
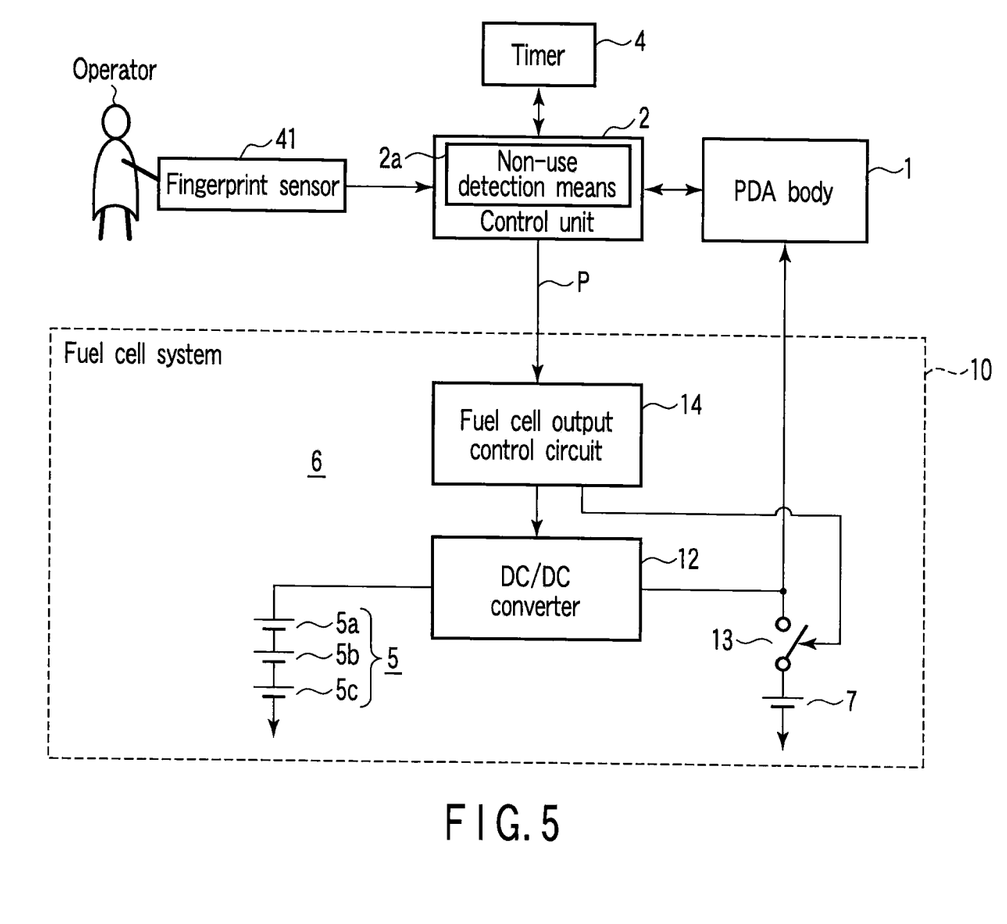
FIG. 5 is a block diagram which schematically shows an electronic apparatus according to a fourth embodiment of the invention.

FIG. 5 schematically shows the electronic apparatus according to the fourth embodiment of the invention. In the description of FIG. 5, the same parts as those in FIG. 1 are denoted by like reference numerals, and a description is omitted.

In FIG. 5, numeral 41 denotes a fingerprint sensor. The fingerprint sensor 41 is, for example, assembled in a frequently used key of the input unit 3. With the operation of this key, the fingerprint sensor 41 outputs fingerprint data which identifies the operator as the PDA owner. The control unit 2 is connected to the fingerprint sensor 41. In the control unit 2, the non-use detection means 2a compares the fingerprint data, which is detected by the fingerprint sensor 41, with the fingerprint data of the PDA owner which is prepared in advance. If the comparison result shows disagreement between both fingerprint data and the state of disagreement continues for a predetermined time period which is preset in the timer 4, the PDA is determined to be in the non-use state and the PDA non-use signal P is output.

As has been described above, the fingerprint data which is detected by the fingerprint sensor 41 is compared with the fingerprint data of the PDA owner which is prepared in advance. For example, when the operator moves away from the PDA, the acquisition of the fingerprint data from the fingerprint sensor 41 is interrupted and the comparison result shows disagreement between both fingerprint data. If this state continues for the predetermined time period that is preset in the timer 4, it is determined that the PDA is in the non-use state. Accordingly, the PDA non-use signal P is output, thereby forcibly turning off the operation of the DC/DC converter 12. Thus, the output from the DC/DC converter 12 (DMFC unit 5) is stopped, and the output from the auxiliary power supply 7 can be shut off.

Furthermore, in the present embodiment, the fingerprint data that is detected by the fingerprint sensor 41 is always compared with the fingerprint data of the PDA owner which is prepared in advance. Therefore, even when the PDA is used by a person other than the owner, the power generation of the DMFC unit 5 can forcibly be stopped, and unlawful use of the PDA by a third person can be prevented.

Fifth Embodiment

Next, an electronic apparatus according to a fifth embodiment of the invention is described.

Figure 6:
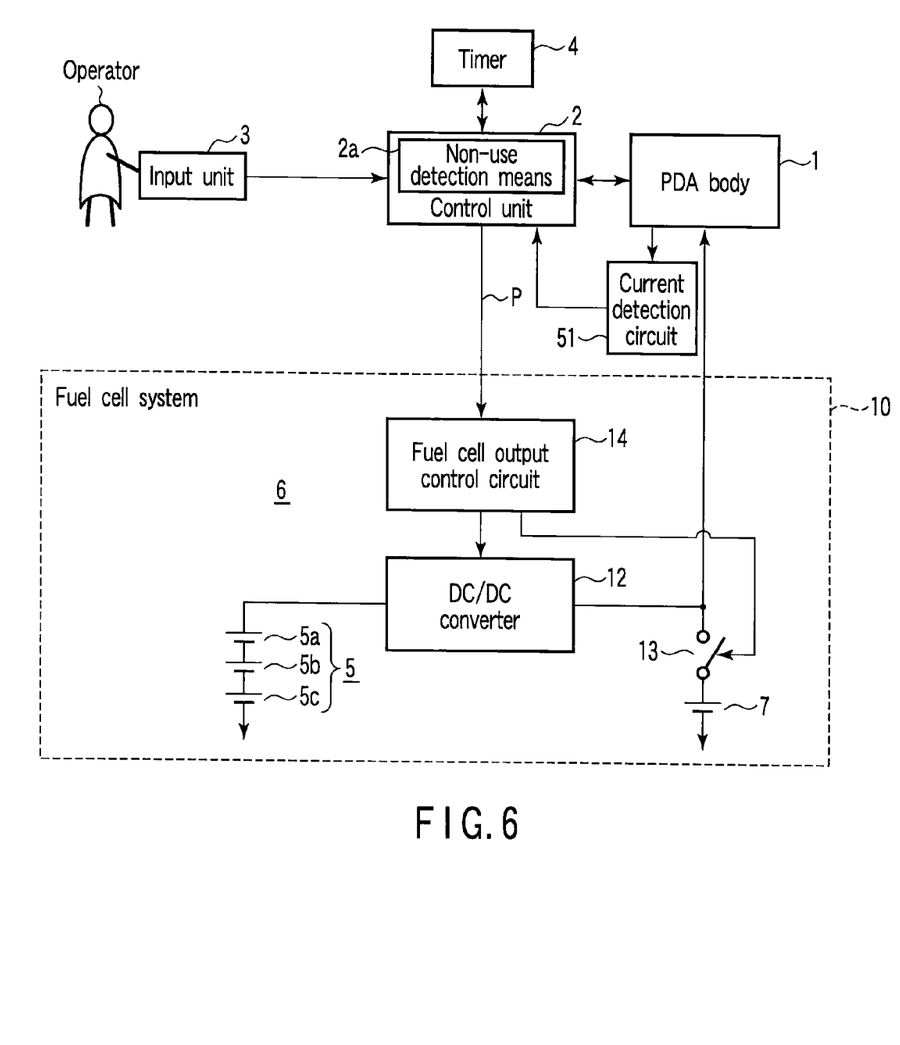
FIG. 6 is a block diagram which schematically shows an electronic apparatus according to a fifth embodiment of the invention.

FIG. 6 schematically shows the electronic apparatus according to the fifth embodiment of the invention. In the description of FIG. 6, the same parts as those in FIG. 1 are denoted by like reference numerals, and a description is omitted.

In FIG. 6, numeral 51 denotes a current detection circuit which functions as electricity amount detection means. The current detection circuit 51 detects an electric current consumption in the PDA 1. The control unit 2 is connected to the current detection circuit 51. In the control unit 2, the non-use detection means 2a monitors a variation in current consumption which is detected by the current detection circuit 51. If the value of the current consumption which is detected by the current detection circuit 51, that is, the value of the current consumption which corresponds to the state in which the PDA 1 is not used, continues for a predetermined time period that is preset in the timer 4, it is determined that the PDA is in the non-use state and the PDA non-use signal P is output.

As has been described above, the variation of the electric current consumption of the PDA 1 is monitored. If the value of the current consumption corresponds to the current value in the state in which the PDA 1 is not used and this state continues for the preset predetermined time period, it can be determined that the PDA is in the non-use state. Accordingly, the PDA non-use signal P is output, thereby forcibly turning off the operation of the DC/DC converter 12. Thus, the output from the DC/DC converter 12 (DMFC unit 5) is stopped, and the output from the auxiliary power supply 7 can be shut off.

Sixth Embodiment

Next, an electronic apparatus according to a sixth embodiment of the invention is described.

Figure 7:
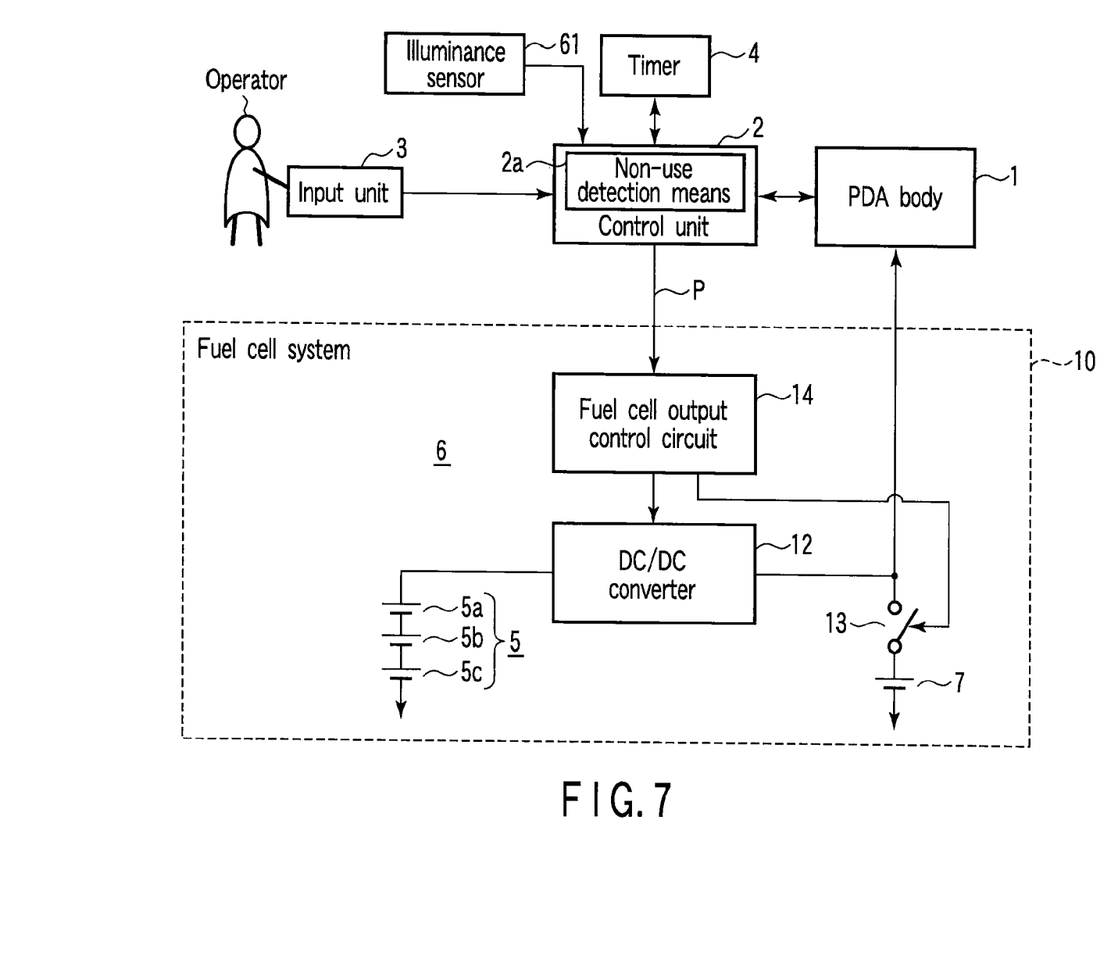
FIG. 7 is a block diagram which schematically shows an electronic apparatus according to a sixth embodiment of the invention.

FIG. 7 schematically shows the electronic apparatus according to the sixth embodiment of the invention. In the description of FIG. 7, the same parts as those in FIG. 1 are denoted by like reference numerals, and a description is omitted.

In FIG. 7, numeral 61 denotes an illuminance sensor functioning as brightness detection means. The illuminance sensor 61 detects the brightness around the PDA 1. The control unit 2 is connected to the illuminance sensor 61. In the control unit 2, the non-use detection means 2a monitors a variation of brightness data which is detected by the illuminance sensor 61. If the value of the brightness data which is detected by the illuminance sensor 61, for example, the value of the brightness data corresponding to the state in which the PDA is put in a dark place, such as the pocket or bag, continues for a predetermined time period that is preset in the timer 4, it is determined that the PDA is in the non-use state and the PDA non-use signal P is output.

Accordingly, the brightness around the PDA is detected by the illuminance sensor 61. For example, if the PDA is put in a dark place, such as the pocket or bag, and if the output of the illuminance sensor 61 becomes a value corresponding to this state and the state of this value continues for the preset predetermined time period, it is determined that the PDA is in the non-use state. Accordingly, the PDA non-use signal P is output, thereby forcibly turning off the operation of the DC/DC converter 12. Thus, the output from the DC/DC converter 12 (DMFC unit 5) is stopped, and the output from the auxiliary power supply 7 can be shut off.

Figure 8:
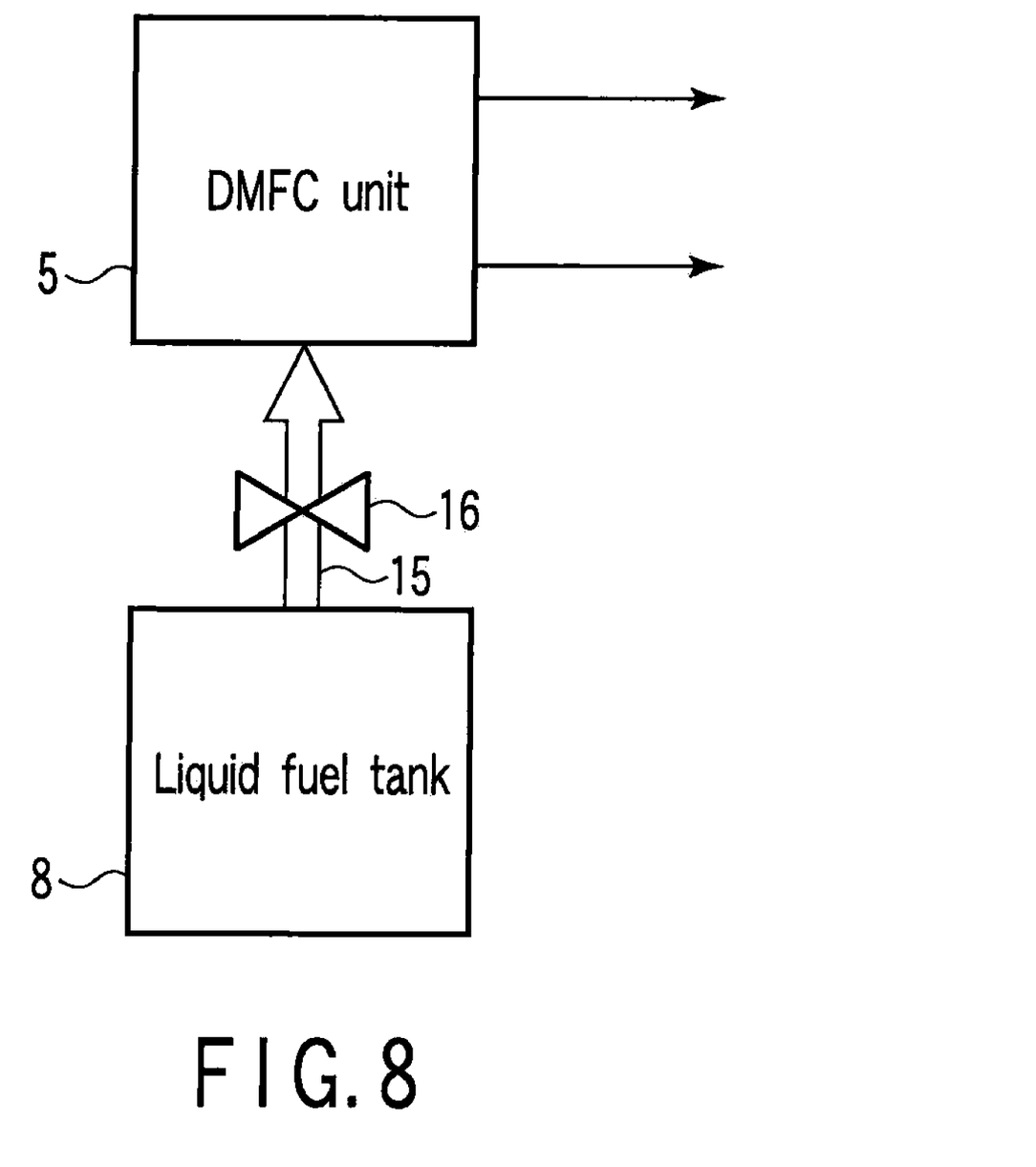
FIG. 8 is a block diagram which schematically shows a structure for stopping power generation of a DMFC unit according to a modification of the invention.

In each of the above-described embodiments, if the PDA is determined to be in the non-use state for the preset predetermined time period, the PDA non-use signal is output and the fuel cell output control circuit 14 forcibly turns off the operation of the DC/DC converter 12. However, for example, as shown in FIG. 8, a valve 16 may be disposed on a fuel supply path 15 between the DMFC unit 5 and the liquid fuel tank 8. The valve 16 is forcibly closed by the fuel cell output control circuit 14 to shut off the supply of fuel. Thereby, the power generation of the DMFC unit 5 is stopped. Similarly, the air supply port of the DMFC unit 5 may be closed to shut off the supply of air, thereby stopping the power generation of the DMFC unit 5. Needless to say, the method of shutting off the supply of fuel and the method of shutting off the supply of air may be combined. Thereby, in addition to the above-described advantageous effects, a cross-over phenomenon in the DMFC unit 5 (a phenomenon in which methanol fuel leaks from the anode side to the cathode side) can surely be prevented. Therefore, compared to the conventional case in which fuel is constantly supplied and a power output is generated even when the non-use state of the PDA continues for a long time, useless consumption of fuel can be avoided and the fuel consumption efficiency can be improved. Moreover, degradation with the passing of time, which results from the chemical reaction due to the cross-over phenomenon, can be prevented, and the increase of the lifetime of the DMFC unit 5 can be realized.

Besides, in each of the above-described embodiments, the operation of the DC/DC converter 12 is forcibly turned off. Alternatively, a switch may be disposed on an electric path on the outside of the DC/DC converter 12, and this switch may be forcibly turned off by the PDA non-use signal P. Even with this structure, the load side of the DMFC unit 5 may be disconnected to stop the output from the DMFC unit 5. Additionally, the methods of the first to sixth embodiments may properly be combined. Although the PDA is exemplified as the electronic apparatus in each of the above-described embodiments, the invention is applicable to other small-sized electronic apparatuses such as portable audio devices.

The present invention is not limited directly to the above-described embodiments. In practice, the structural elements may be modified and embodied without departing from the spirit of the invention. Structural elements disclosed in the embodiments may properly be combined, and various inventions may be made. For example, some structural elements may be omitted from the embodiments. Moreover, structural elements in different embodiments may properly be combined.

For example, in the above description, the fuel cell is configured such that the fuel storage unit is provided under the membrane electrode assembly (MEA). However, the fuel supply from the fuel container unit to the membrane electrode assembly may be performed through a flow path which is disposed therebetween. The passive type fuel cell has been described as an example of the structure of the fuel cell body. However, the invention is applicable to an active type fuel cell and to a so-called semi-passive type fuel cell which uses a pump or the like in a part of the structure for fuel supply. In the semi-passive fuel cell, fuel, which has been supplied from the fuel container unit to the membrane electrode assembly, is used for a power generation reaction, but the fuel is neither subsequently circulated nor returned to the fuel container unit. The semi-passive fuel cell differs from the conventional active type fuel cell in that the fuel is not circulated, and the reduction in size, for example, is not hindered in the semi-passive fuel cell. The fuel cell employs a pump for fuel supply, and is different from a conventional pure passive type fuel cell such as an internal evaporation type fuel cell. Thus, this fuel cell is called "semi-passive type". In the semi-passive type fuel cell, a fuel shut-off valve may be disposed in place of the pump, if fuel is supplied from the fuel container unit to the membrane electrode assembly. In this case, the fuel shut-off valve is provided in order to control the supply of liquid fuel via a conduit.

Even with these structures, the same advantageous effects as described above can be obtained. As regards the vapor of fuel that is supplied to the MEA, the vapor of all fuel may be supplied, but the invention is also applicable to the case in which a part of the fuel is supplied in a liquid state.

The present invention is not limited to the above-described embodiments. At the stage of practicing the invention, various modifications may be made without departing from the spirit of the invention. Further, the embodiments include various inventions at various stages, and various inventions may be derived by properly combining structural elements disclosed in the embodiments. For example, even if some structural elements are omitted from all the structural elements disclosed in the embodiments, structures from which these structural elements are omitted may be derived as inventions in the case where the object of the invention and the advantageous effects, which are described in the specification, can be achieved.

As has been described above, the present invention can provide an electronic apparatus using a fuel cell as a power supply, which can stop output from the power supply by detecting a non-use state of the electronic apparatus, and a fuel cell system.

What is claimed is:

1. An electronic apparatus comprising:
an electronic unit;
power supply means for supplying electric power to the electronic unit, the power supply means including power generation means having a fuel cell unit, and an auxiliary power supply which is charged by an output of the power generation means;
brightness detection means for detecting ambient brightness to generate a brightness signal;
non-use determination means for determining a non-use state of the electronic unit, if the brightness signal has a value which is lower than a predetermined value corresponding to a dark place and is maintained for a predetermined time period; and
control means for stopping the output of the power generation means and shutting off an output of the auxiliary power supply, upon detection of the non-use state by the non-use detection means.

2. The electronic apparatus according to claim 1, further comprising operation means for operating the electronic unit, wherein the non-use determination means determines the non-use state of the electronic unit in a case where the operation means is not operated continuously for a predetermined time period.

3. The electronic apparatus according to claim 1, further comprising electrostatic capacitance detection means for detecting a variation in electrostatic capacitance in the electronic unit,
wherein the non-use determination means determines the non-use state of the electronic unit in a case where the electrostatic capacitance, which is detected by the electrostatic capacitance detection means, is in a state of a predetermined value continuously for a predetermined time period.

4. The electronic apparatus according to claim 1, further comprising image pickup means for capturing an image of characteristic parts of an operator, and memory means for storing image data of the characteristic parts of the operator in advance,
wherein the non-use determination means determines the non-use state of the electronic unit in a case where a state of disagreement between a captured image, which is acquired by the image pickup means, and image data in the memory means continues for a predetermined time period.

5. The electronic apparatus according to claim 1, further comprising fingerprint detection means for detecting fingerprint data of an operator,
wherein the non-use determination means determines the non-use state of the electronic unit in a case where a state of disagreement between the fingerprint data, which is detected by the fingerprint detection means, and fingerprint data of the operator, which is prepared in advance, continues for a predetermined time period.

6. The electronic apparatus according to claim 1, further comprising electricity amount detection means for detecting an electricity consumption amount of the electronic unit,
wherein the non-use determination means determines the non-use state of the electronic unit in a case where the electricity consumption amount, which is detected by the electricity amount detection means, is in a state of a predetermined value continuously for a predetermined time period.

7. The electronic apparatus according to any one of claims 1 to 6, wherein the power generation means includes a fuel cell unit and output adjusting means for adjusting an output of the fuel cell unit,
wherein the control means stops an operation of the output adjusting means and shuts off an output of the auxiliary power supply, upon detection of the non-use state by the non-use detection means.

8. The electronic apparatus according to any one of claims 1 to 6, wherein the control means stops supply of at least one of fuel and air to the fuel cell unit, and shuts off an output of the auxiliary power supply, upon detection of the non-use state by the non-use detection means.

9. A fuel cell system which supplies electric power to an electronic unit and includes power generation means having a fuel cell unit and output adjusting means for adjusting an output of the fuel cell unit, and an auxiliary power supply which is charged by an output of the power generation means,
wherein the fuel cell system includes control means for stopping the output of the power generation means and shutting off an output of the auxiliary power supply, on the basis of a non-use state of the electronic unit.

10. The fuel cell system according to claim 9, wherein the control means stops an operation of the output adjusting means and shuts off the output of the auxiliary power supply, on the basis of the non-use state of the electronic unit.

11. The fuel cell system according to claim 9, wherein the control means stops supply of at least one of fuel and air to the fuel cell unit, and shuts off the output of the auxiliary power supply, on the basis of the non-use state of the electronic unit.

* * * * *